United States Patent [19]
DeLiso et al.

[11] Patent Number: 5,488,021
[45] Date of Patent: Jan. 30, 1996

[54] ACTIVATED CARBON BODIES HAVING CLAY BINDER AND METHOD OF MAKING SAME

[75] Inventors: Evelyn M. DeLiso; Kenneth E. Zaun, both of Corning, N.Y.

[73] Assignee: Corning Incorporated, Corning, N.Y.

[21] Appl. No.: 168,170

[22] Filed: Dec. 17, 1993

[51] Int. Cl.⁶ .................................................. B01J 29/06
[52] U.S. Cl. .............................. 502/63; 502/80; 502/413; 502/416
[58] Field of Search ............................... 502/63, 80, 413, 502/416

[56] References Cited

U.S. PATENT DOCUMENTS

| | | | |
|---|---|---|---|
| 3,770,647 | 11/1973 | Dautzenberg et al. | 502/80 |
| 4,518,704 | 5/1985 | Okabayashi et al. | 502/80 |
| 5,376,609 | 12/1994 | Guile | 502/62 |

FOREIGN PATENT DOCUMENTS 49-115110  11/1974  Japan.
57-122924  7/1982  Japan.

OTHER PUBLICATIONS

"An Introduction to Clay Colloid Chemistry", H. van Olphen, 2nd. Ed., pp. 57–71'. 1977 (No Month).
"Chemistry of Clays and Clay Minerals", A. C. D. Newman, Ed., Longman Scientific & Technical, London, 1987, pp. 11–12 and 107–114. (No Month).

*Primary Examiner*—Ferris Lander
*Assistant Examiner*—Thomas G. Dunn, Jr.
*Attorney, Agent, or Firm*—L. Rita Quatrini

[57] ABSTRACT

A body made of activated carbon particles bonded together with a clay binder which can be attapulgite and/or sepiolite, and a plasticizing organic binder. The organic binder is more typically cellulose ether and/or cellulose ether derivative at a level of about 2 to 12 wt. % and the clay about 2% to about 30 wt % based on the carbon and clay. A method for making the body involves forming an aqueous mixture composed of the clay, organic binder and carbon, forming the mixture into a body, and drying the formed body.

17 Claims, 1 Drawing Sheet

ACTIVATED CARBON BODIES HAVING CLAY BINDER AND METHOD OF MAKING SAME

This invention relates to carbon bodies which are made from mixtures containing a clay binder which can be attapulgite and/or sepiolite. This type of binder when used according to the present invention improves the low temperature strength without sacrificing their adsorption capacity, thus enabling their more effective use in gas phase low temperature adsorption applications.

BACKGROUND OF THE INVENTION

Activated carbon materials have found use in a variety of applications in the gas phase such as for example radon testing, gas masks, adsorption of volatile organic compounds, etc.

The predominant commercial use for activated carbon is in the form of granules. While activated carbon in the form of granules can perform the desired adsorption for many applications, there are some applications in which the granules have drawbacks. In some cases back pressure of a packed bed of granules is a problem. Some applications can result in considerable wear of the granules by attrition, causing loss of material or bed packing. Furthermore, the fines which are generated as a result of attrition can block the flow path.

Another approach is to use an extruded activated carbon in the form of a cellular structure such as a honeycomb. The honeycomb can readily be shaped by extruding fine powders of activated carbon with suitable binders. Such a shape allows for ease of flow of the gases through the honeycomb with little back pressure. Also, since the honeycomb is a solid piece, there should be little or no wear or attrition of the carbon.

In order to form an activated carbon honeycomb by extrusion, the carbon must be in the form of a fine powder. This can then be mixed with a liquid such as water and suitable plasticizers and binders. This plasticized mixture is then extruded through a die into the honeycomb shape, and dried.

These bodies sometimes suffer from low strength both in the as-extruded state and in the as-dried state. They can also develop cracks during the drying procedure. This is especially evident in the larger bodies due to differential shrinkage which occurs because of loss of moisture between the outer surfaces and the interior of the body.

Clays have been used as binders in carbon mixtures to impart strength to the carbon body formed therefrom.

U.S. Pat. No. 4,518,704, JP 57-122924 (1982), and 49-115110 (1974) relate to bodies containing or made of activated carbon in which clay binders are used.

It is highly desirable to improve the strength of the extruded honeycomb both in the extruded state for further processing and handling and also after drying to improve performance. The present invention provides such improved bodies and a method for making them.

SUMMARY OF THE INVENTION

In accordance with one aspect of the invention, there is provided a body made of activated carbon particles bonded together with a clay binder which can be attapulgite and/or sepiolite, and a plasticizing organic binder. The organic binder is more typically cellulose ether and/or cellulose ether derivative at a level of about 2 to 12 wt. %, and the clay at about 2% to about 30 wt % based on the carbon and clay.

In accordance with another aspect of the invention, there is provided a method for making the above described body, which involves forming an aqueous mixture composed of the clay, organic binder and carbon, forming the mixture into a body, and drying the formed body.

DETAILED DESCRIPTION OF THE INVENTION

Figure 1:
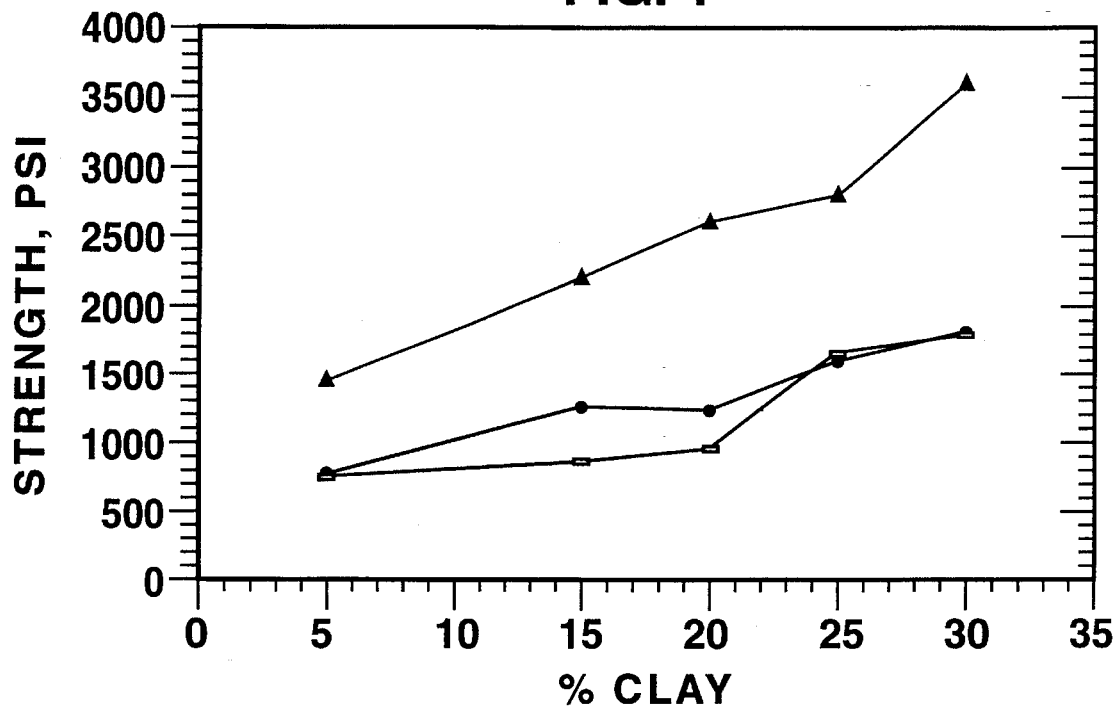
FIG. 1 is a plot of amount of clay versus the room temperature strength of bodies of the present invention.

The activated carbon bodies of the present invention are characterized by having carbon particles bound together by a clay binder and a plasticizing organic binder.

The activated carbon bodies of the present invention are made by shaping a body from an aqueous mixture of activated carbon, plasticizing organic binder, and clay which can be attapulgite clay, sepiolite clay or combinations thereof. The body is dried.

As a result of the clay binder according to the present invention, the bodies thus produced exhibit the characteristics of high strength at low temperatures, that is in the as-formed and as-dried state, up to temperatures of for example, about 200° C. They also exhibit high adsorption capacity.

The type of carbon

Activated carbon is a non-graphitic microcrystalline form of carbon which has been processed to produce a carbon with high porosity. The microcrystalline areas are made up of six-member carbon rings which are separated by areas of disorganized carbon. Activated carbon, typically has a high $N_2$ BET surface area in the range of about 450 to about 1800 $m^2/g$. There are various types of microporosity present in activated carbon. One classification scheme adopted by the International Union of Pure and Applied Chemistry classifies pores according to their width as follows: micropores which are less than about 2 nanometers, mesopores which are about 2 to about 50 nanometers, and macropores which are more than about 50 nanometers.

Activated carbon from any available source can be used, e.g., coconut shell, such as PCB-P from Calgon Carbon, Pittsburgh, Pa., wood based, such as Nuchar® available from WestVaco, Chemical Division, Covington, Va., coal based such as Calgon Carbon BPL-F3, and WPH-P. Or it can be made from pyrolysis of organic compounds. An example of the latter is highly sulfonated styrene/divinylbenzene ion exchange resin, such as Ambersorb® available from Rohm and Haas, Philadelphia, Pa.

Depending on the application, the nature of the activated carbon can vary as far as particle size, surface area, adsorption capacity, e.g., for volatile organics as hydrocarbons, adsorption efficiency, porosity, pore size, etc. The carbon can be a single type or a blend of types based on for example, precursor source, particle size, porosity, etc.

Preferably, the activated carbon powder is a fine powder wherein the median particle size is about 5 to about 40 micrometers in diameter as measured by Coulter Counter technique.

If the mixture is to be extruded into a honeycomb body, it is advantageous that the particles have an upper limit in size which is about one-half to about one-third the thickness of the honeycomb cell wall formed during extrusion. Some advantage may be achieved in terms of stiffening the batch rheology by blending different particle size distributions.

One source of activated carbon suitable for use in this invention is BPL-F3 activated carbon available from Calgon Carbon Corp. in several particle sizes and at different measurements of surface area. A particular preferred variety of activated carbon from this source is the "6×16" mesh size, which is available at a surface area of about 1050 to about 1300 $m^2/g$.

Especially suited to the practice of the present invention is a mixture of activated carbon such as Calgon Carbon BPL-F3 or Calgon Carbon WHP-P, or both, which in the practice of the present invention are ground to an average particle size of about 5 to about 10 micrometers in diameter, and Nuchar® SN-20 a coarser powder available from Westvaco, having an average particle size of about 30 to about 40 micrometers in diameter as measured using the Coulter Counter technique.

The clay binder

A discussion of clays is found in "An Introduction to Clay Colloid Chemistry", H. van Olphen, 2nd. Ed., pp. 57–71, and "Chemistry of Clays and Clay Minerals", A. C. D. Newman, Ed., Longman Scientific & Technical, London, 1987, pp. 11–12 and 107–114. According to these publications, clays are layered alumino-silicates, the different classes of which are characterized structurally according to the arrangement of ordering of the layers and chemically according to the cations that are present such as Al, Si, Mg, Na, or Li. There are six main groups of clays that are characterized by their structure. These groups include the following: 1) kaolinite (kaolin), 2) pyrophyllite-talc group, 3) micas, 4) chlorites, 5) smectites and vermiculites, 6) palygorskite and sepiolite. Dioctahedral smectites are subdivided chemically into montmorillonite, beidellite, and nontronite. Montmorillonite and beidellite chemically are alumina rich whereas nontronite is iron rich.

The two principal building blocks which make up most clays are an atom of silicon surrounded by 4 oxygen atoms or tetrahedrally coordinated, and an aluminum or magnesium atom surrounded by six oxygen atoms or hydroxyl groups also referred to as octahedrally coordinated. These building blocks are arranged into layers or sheets. In a silica sheet, also called a tetrahedral sheet, three of the four oxygen atoms of each tetrahedron are shared by three neighboring tetrahedra and the fourth oxygen atom of each tetrahedron is pointed downward. For the octahedral sheet or alumina or magnesia sheet, the cation, either Al or Mg, is surrounded by oxygen or hydroxyl atoms located on the six corners of a regular octahedron.

Minerals that have a 1:1 layer structurally consist of alternating silica and alumina sheets. Kaolin is a 1:1 layer mineral. Chemically kaolin has very little atom substitution into its clay structure.

The 2:1 layer minerals include pyrophyllite, talc, mica, chlorite, smectite, and vermiculite. Montmorillonite (common name is bentonite) is an example of a 2:1 layer mineral which has an alumina or magnesium sheet surrounded on either side by a silica sheet. The unique characteristic of montmorillonite clay is that when it comes into contact with water or vapor it swells. Palygorskite (common name attapulgite) and sepiolite are distinguished from the other layered clay minerals by having an entirely different arrangement of tetrahedral and octahedral elements within a unit cell. (A unit cell is an arrangement of atoms in a crystalline material the shape and size of which determine the response of the material to irradiation by x-rays. The arrangement of the atoms within the unit cell determines the relative intensity of the x-ray diffraction lines. The size and shape of the atoms determines the angular position of the diffraction lines.) The structure of attapulgite and sepiolite does not contain a continuous octahedral sheet. Instead, the structure consists of octahedral sheets in the form of ribbons attached alternately to opposite sides of the continuous sheets of $SiO_4$ tetrahedra. The tetrahedra point in opposite directions in order to coordinate with the octahedral ribbons. The structure and composition of the ribbon-like edge is proportionately present to a much greater extent than in other layered silicate structures. This ribbon-like edge is responsible for the chemistry and properties of attapulgite and sepiolite clay.

Attapulgite and sepiolite crystallize in the form of long needles. Open channel structures exist within these structures which run parallel with the edges of the ribbons and the length of the fiber axes. These channels can be filled with water or absorbed ions. Attapulgite is more highly substituted than is sepiolite. Attapulgite clay is a crystalline hydrated magnesium aluminum silicate. Attapulgite tends towards a dioctahedral composition having a ratio of Mg to trivalent cations between 3:1 and 1:3. Compositionally, sepiolite contains predominately Mg in octahedral sites and is thus octahedral.

Due to the unique structure of attapulgite clay, it cannot swell apart as a montmorillonite does, for example. The presence of attapulgite clay in an activated carbon honeycomb renders the honeycomb nonreactive with water. For example, some activated carbon honeycomb compositions made with bentonite clay as the binder and processed using the same procedure described in this application dissolve almost immediately after they are placed in water. As the bentonite rehydrates, it swells. This swelling causes the honeycomb to break apart. Honeycombs made with attapulgite clay as the binder retain their shape and strength immediately after they are placed in water.

Attapulgite clay is a high surface area material which is also porous. The $N_2$ BET surface area of attapulgite clay is significantly higher than for the other types of clay mentioned here. The $N_2$ BET surface area of attapulgite clay falls within the range of about 120 to about 150 $m^2/g$, whereas the respective surface areas for the specific types of bentonite and kaolin clays used in the examples in Table 1 are about 50–60 $m^2/g$ and about 7–9 $m^2/g$.

Attapulgite clay is commercially available. It is supplied in both thermally activated form and in non-activated state. It is preferred to use the clay in the activated state because there is less cracking in the product body. Some sources of attapulgite clay are supplied by Englehard under the names of Attagel® 50 and Attasorb® LVM, the latter having a $N_2$ BET surface area of about 120 $m^2/g$. Attagel® 50 is a raw or mined clay which has not been heat treated. Attasorb® LVM has been thermally activated by a high temperature drying process, and therefore is the more preferred of the two.

The Organic Binder

The organic binder can be any known plasticizing organic binder, that contributes to the plasticity of the mixture for shaping into a body. Typical plasticizing organic binders are cellulose ether type binders and/or their derivatives some of which are thermally gellable. The more typical organic binders, according to the present invention are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are most typically used in the practice of the present invention. Methylcellulose, hydroxypropyl methylcellulose, and combinations thereof are especially preferred. Preferred sources of cellulose ethers and/or derivatives thereof, are Methocel® A4M and 20–333, F4 and F40 from Dow Chemical Co. Methocel® A4M is a methylcellulose binder having a gel temperature of 50°–55° C., and a gel strength of 5000 g/cm$^2$ (based on a 2% solution at 65° C.). Methocel® 20–333, F4, and F40 are hydroxypropyl methylcellulose.

An aqueous mixture is formed comprising in percent by weight about 2% to about 12% of the organic binder, about 2% to about 30% of the clay, with the balance of the mixture being activated carbon particles.

The higher the clay content, the higher is the organic binder content required to impart plasticity to the mixture. Too high a clay content interferes with the adsorption capacity of the body.

The clay content is chosen depending on the properties which are desired in the body.

For example, for bodies in which high strength is desired, the clay content is relatively high. With attapulgite clay, levels of about 15% to about 30% are preferred with organic binder levels, especially the preferred organic binders, of about 8% to about 10%.

In bodies in which high adsorption capacity is desired, the clay content is generally lower than if strength is the predominant consideration. For high adsorption capacity, with attapulgite clay, levels of about 5% to 15% are preferred with organic binder levels, especially the preferred organic binders, of about 5% to about 7%.

The weight percent of clay, organic binder, and water are calculated as follows:

$$100 \frac{\text{wt. of clay (or organic binder, or water)}}{\text{wt. of activated carbon} + \text{clay}} \times$$

The mixture is formed by dry blending the solid components and then mixing with water. One technique of mixing, although it is to be understood that the invention is not limited to such is to place the dry blended components in a Muller mixer or other type of mixer such as a sigma blade or double arm mixer. While the solids are being mixed, water is added. Once the water is added, the Muller or other mixer is run until the batch compacts and becomes plasticized.

The water content in the mixture can be adjusted in order to impart optimum plasticity and handleability to the mixture. As the mixture is being mixed and water is being added, a point is reached at which the water is sufficient to wet all the particles. Continued mixing compacts the powder by removing air, and the compacted powder starts to agglomerate into lumps. Continued mixing results in these lumps becoming plastic. Excess water makes these lumps too soft for the forming process. Generally, the water content is about 80% to about 150%.

In order to aid mixing, the batch can be pre-extruded one or several times such as by extruding through a multi-hole strand die to effect further mixing and to substantially homogenize the batch mixture.

Once the mixture is observed to be well plasticized, as indicated by hand or torque rheometer, it is formed into a body.

The bodies according to the present invention can have any convenient size and shape. For adsorption applications, the preferred shape is a cellular body such as a honeycomb structure. Some examples of honeycombs produced by the process of the present invention, although it is to be understood that the invention is not limited to such, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Typical geometries for high capacity gas adsorption applications are the 94 cells/cm$^2$ (about 600 cells/in$^2$), and about 62 cells/cm$^2$ (about 400 cells/in$^2$) bodies. Wall (web) thicknesses range typically from about 0.1 to about 0.6 mm (about 4 to about 25 mils). The external size and shape of the body is controlled by the application and is not limited to those described above. For example, other combinations of cell densities and wall thicknesses can be made.

The forming can be done by any method that makes use of shaping a plasticized mixture. The preferred method of forming is by extrusion. A ram extruder is typically used, although any extrusion equipment known in the art can be used such as a continuous auger or twin screw extruder.

In forming honeycomb structures, it is preferred to extrude the mixture through a honeycomb die.

If desired, the formed body can be cut into parts of varying sizes.

The resulting formed body is then dried at temperatures not higher than about 125° C. to remove water. Because the bodies have a relatively high water content due mostly to the porosity of the carbon particles, care is taken to ensure that the bodies dry slowly and evenly so that they do not crack.

Several drying procedures can be employed and the choice of procedure depends largely on the size of the bodies being dried.

For example, small bodies, that is, bodies which have at least one dimension which is no greater than about 2.54 cm (1") can be dried by wrapping the bodies in aluminum foil and placing in a dryer set at no higher than about 100° C., typically at about 95° C. for a sufficient time to remove the water. The foil creates a humid environment so that the extruded body dries slowly and uniformly thus preventing cracking. Drying time can vary depending on the size of the body. For example, for a 2.54 cm (1") diameter, 22.9 cm (9") long honeycomb, the drying time is typically about 3 days.

Drying of large size crack-free activated carbon bodies containing more than about 100% water in the as formed state is difficult. Large size bodies according to the present invention are those having all dimensions greater than about 2.54 cm. For example, with honeycombs, initially, surface drying is so rapid that the bodies crack within about 10 minutes when left at ambient conditions;. When water is removed from the surface by rapid drying, an outer ring of dried honeycomb shrinks more than the center of the honeycomb which is still moist. Thus, the mechanism for cracking is differential shrinkage between the outer ring of dried honeycomb and the interior which still contains a high level of moisture.

The problem of differential shrinkage causing cracking can solved by using controlled humidity drying which accomplishes the uniform transfer of moisture from the center of the honeycomb outward. The initial portion of a controlled humidity drying schedule maintains the humidity at high levels of for example >90% relative humidity. Controlled humidity drying schedules are used for drying activated carbon honeycombs made by the manner of this invention in sizes greater than about 5.08 cm (about 2") in diameter.

Controlled humidity drying can be used also for small bodies.

In accordance with a preferred embodiment, the controlled humidity drying is done as follows.

(1) The temperature of the as-formed body is raised to a first temperature of no greater than about 90° C., preferably about 60° C. to about 90° C., without allowing the body to lose moisture. This step is done typically in a high humidity atmosphere (relative humidity of greater than about 90%) and mainly to prevent surface evaporation from the body.

(2) While the body is at the first temperature, moisture is slowly removed from the body until it has about 45% to about 65% by weight moisture remaining. This step is done typically in a high humidity atmosphere. Slow removal of moisture is necessary to prevent cracking.

(3) While the body is at the first temperature, the humidity to which the body is exposed is lowered for the purpose of increasing the rate of moisture removal. This is done to drop the moisture content in the body to no less than about 20% by weight of the starting moisture content, and typically about 10% to about 20%.

The strength of activated carbon bodies produced by the method of the present invention is higher than that of bodies produced using some other well-known clay binders as will be shown in the examples that follow.

To more fully illustrate the invention, the following non-limiting examples are presented. All parts, portions, and percentages are on a weight basis unless otherwise stated.

EXAMPLES 1–15

Compositions of activated carbon, clays and A4M methylcellulose were made up as given in Table 1 below with additions of water. The percents were based on the weight of the activated carbon and clay combined. Each body represented in Table 1 contained two kinds of activated carbon in a ratio of about 1:4 with WestVaco Nuchar® SN-20 being the activated carbon present in the lower amount and Calgon Carbon's BPL-F3 ground to about-200 mesh being the activated carbon present in the larger amount. The clays were bentonite, kaolin, and attapulgite being respectively, G-129 from Kaopolite, Inc., Glomax LL from Dry Branch Kaolin, and Attasorb® LVM. Honeycombs measuring about 2.54 cm (1") in diameter and having about 31 cells/cm² (200 cells/in²), and a wall thickness of about 0.4 mm (15 mil) were extruded with the compositions of Table 1. Each honeycomb was wrapped in aluminum foil and dried at about 95° C. for about 3 days. Crushing strengths and adsorption capacity were measured as described below.

Crushing strengths are measured in a compression tester made by Tinius Olsen at a cross head rate of about 2.54 mm (about 0.1")/min. Each sample number reported is an average of measurements on six different pieces. Strengths were measured at room temperature on the samples as-dried.

Butane adsorption capacity was measured by placing test samples in a Vycor® tube housed inside a tube furnace having inlet and outlet ports. A 1500 volume ppm butane gas stream in a nitrogen carrier gas was introduced to the sample at a flow rate of about 4,000 cc/min. and adsorption was measured by monitoring the exit gas stream with a flame ionization detector. Adsorption at room temperature was considered complete when the calibrated detector reading had reached about 95%. At this time, the inlet gas stream was changed to nitrogen and desorption of the butane at room temperature was measured. When the detector reading reached a value of about 5%, the temperature of the sample was raised to about 100° C. by increasing the furnace temperature to remove the rest of the butane adsorbed on the sample. The detector readings were plotted versus time and the adsorption and desorption were measured by integrating the area of each curve. The values reported for adsorption are the milligrams of butane adsorbed divided by the sample mass after testing.

Figure 2:
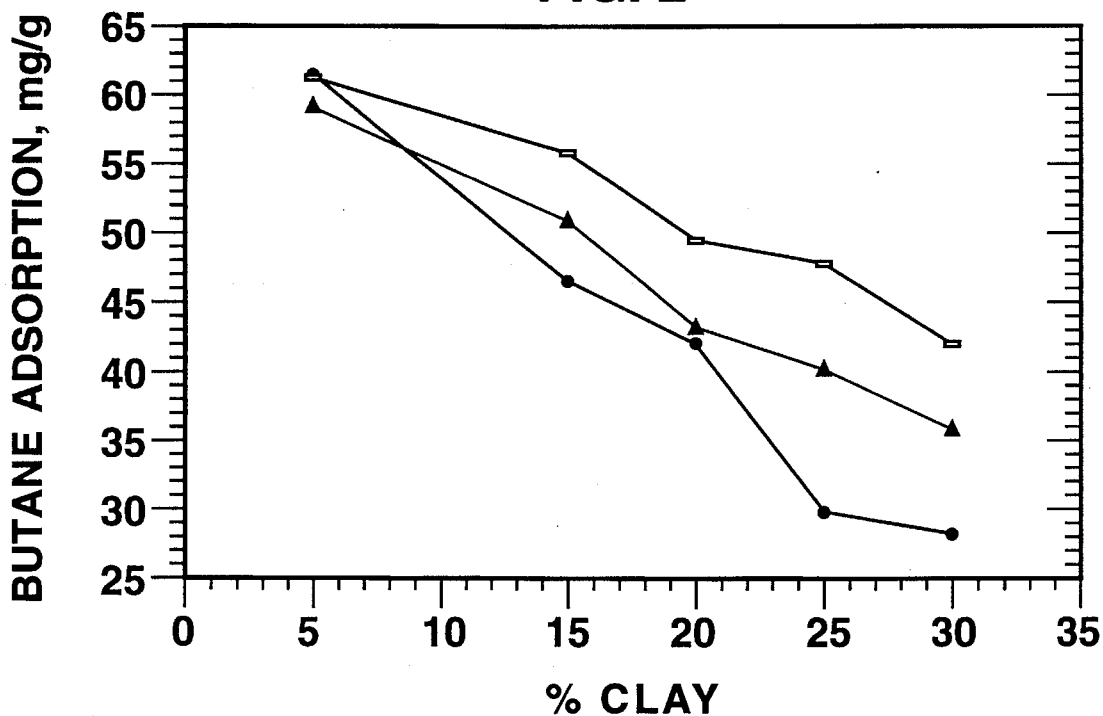
FIG. 2 is a plot of amount of clay versus the butane adsorption of bodies of the present invention.

The strengths and adsorption capacities for each composition are given in Table 1 and plotted in FIGS. 1 and 2 respectively. The results show that the strength values for the compositions with the attapulgite clay are higher for a given clay and organic binder content, as shown by direct comparison of Nos. 1, 6, and 11, and 4, 9, and 14. Adsorption capacity is comparable for these clays at a given level of clay. As the clay binder and organic binder content increase, the adsorption capacity falls off somewhat. Therefore, depending on what properties are desired (strength or adsorption capacity, or a combination of both) in the product body, the most effective combination of binders can be chosen.

TABLE I

| No. | Clay (%) | Organic Binder (%) | Water % | Dried Strength PSI | Butane Adsorption mg/g |
|---|---|---|---|---|---|
| BENTONITE | | | | | |
| 1 | 5 | 6 | 135 | 791 | 61.4 |
| 2 | 15 | 6 | 133 | 1242 | 46.4 |
| 3 | 20 | 6 | 120 | 1231 | 42.1 |
| 4 | 25 | 8 | 112 | 1572 | 29.7 |
| 5 | 30 | 8 | 119 | 1830 | 28.3 |
| KAOLIN | | | | | |
| 6 | 5 | 6 | 134 | 751 | 61.3 |
| 7 | 15 | 6 | 124 | 869 | 55.9 |
| 8 | 20 | 6 | 116 | 949 | 49.4 |
| 9 | 25 | 8 | 110 | 1650 | 47.8 |
| 10 | 30 | 8 | 105 | 1801 | 42.0 |
| ATTAPULGITE | | | | | |
| 11 | 5 | 6 | 143 | 1442 | 59.2 |
| 12 | 15 | 8 | 129 | 2217 | 51.8 |
| 13 | 20 | 8 | 121 | 2607 | 43.1 |
| 14 | 25 | 8 | 120 | 2813 | 40.1 |
| 15 | 30 | 10 | 118 | 3599 | 35.7 |

EXAMPLE 16

An extrusion was made with a mixture of about 78.4% Calgon Carbon WPH-P, and about 19.6% WestVaco Nuchar SN20, about 2% Englehard Attasorb® LVM, and about 6% Dow Chemical Co. K75M methocel. This mixture was mixed with about 85% water and extruded into 2.54 cm diameter honeycombs having a geometry of about 15 cells/cm² (about 100 cells/in²), and wall thickness of about 0.6 mm (25 mil). Drying of the honeycombs was done by wrapping the samples in aluminum foil and placing them in a dryer at about 100° C. for 3 days. The crushing strength was about 1090 psi. The adsorption capacity was measured using the procedure described above with a flow rate of about 2,000 cc.min. The adsorption capacity was about 70.1 mg butane/g of sample., This example illustrates high adsorption capacity with a low clay addition. The reasonable strength of 1090 psi at this low clay addition is due to the thickness of the honeycomb wall.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making a carbon body, said method consisting essentially of:
   a) forming an aqueous mixture comprising about 2% to 30 attapulgite clay, about 2% to 12% plasticizing organic binder selected from the group consisting of methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof, and the balance being activated carbon particles;
   b) forming said mixture into a body; and
   c) drying the formed body.

2. A method of claim 1 wherein the median particle size of the carbon is about 5 to about 40 micrometers in diameter as measured by Coulter Counter technique.

3. A method of claim 1 wherein the organic binder is selected from the group consisting of methylcellulose, hydroxypropyl methylcellulose, and combinations thereof.

4. A method of claim 1 wherein the attapulgite clay content is about 5% to about 15%.

5. A method of claim 4 wherein the organic binder content is about 5% to about 8%.

6. A method of claim 1 wherein the attapulgite clay content is about 15% to about 30%.

7. A method of claim 6 wherein the organic binder content is about 8% to about 10%.

8. A method of claim 1 wherein the forming is done by extruding the mixture.

9. A method of claim 1 wherein the body is formed into a honeycomb structure.

10. A body comprised of activated carbon particles bonded together with about 2% to 30% by weight attapulgite clay binder and about 2% to 12% plasticizing organic binder selected from the group consisting of methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof.

11. A body of claim 10 wherein the median particle size of the carbon is about 5 to about 40 micrometers in diameter as measured by Coulter Counter technique.

12. A body of claim 10 wherein the organic binder is selected from the group consisting of methylcellulose, hydroxypropyl methylcellulose, and combinations thereof.

13. A body of claim 10 wherein the attapulgite clay content is about 5% to about 15%.

14. A body of claim 10 wherein the organic binder content is about 5% to about 8%.

15. A body of claim 10 wherein the attapulgite clay content is about 15% to about 30%.

16. A body of claim 15 wherein the organic binder content is about 8% to about 10%.

17. A body of claim 10 having a honeycomb structure.

* * * * *